United States Patent [19]

O'Coin

[11] Patent Number: 5,271,665
[45] Date of Patent: Dec. 21, 1993

[54] APPARATUS FOR PREVENTING FOREIGN OBJECTS FROM LODGING BETWEEN THE INNER WALLS OF VEHICLE TIRES MOUNTED ON A DUAL WHEEL ASSEMBLY

[76] Inventor: Bernard J. O'Coin, 1266 Old Colony Road, Oakville, Ontario, Canada

[21] Appl. No.: 970,998

[22] Filed: Nov. 3, 1992

[51] Int. Cl.⁵ ............................................. B60B 11/00
[52] U.S. Cl. ..................................... 301/36.3; 301/6.3
[58] Field of Search ....................... 301/6.3, 36.1, 36.3, 301/13.2

[56] References Cited

U.S. PATENT DOCUMENTS

| | | |
|---|---|---|
| 1,260,146 | 3/1918 | Cope . |
| 2,397,741 | 4/1946 | Jordan . |
| 2,603,267 | 7/1952 | Simpson . |
| 3,664,709 | 5/1972 | Barré ................................ 301/36.1 |
| 4,606,581 | 8/1986 | Zepf . |

FOREIGN PATENT DOCUMENTS

| | | |
|---|---|---|
| 1802772 | 5/1970 | Fed. Rep. of Germany . |
| 2901606 | 7/1980 | Fed. Rep. of Germany . |
| 2940834 | 4/1981 | Fed. Rep. of Germany . |
| 3718235 | 12/1988 | Fed. Rep. of Germany . |
| 28590 | 3/1925 | France . |

*Primary Examiner*—Russell D. Stormer
*Attorney, Agent, or Firm*—Shlesinger Arkwright & Garvey

[57] ABSTRACT

The present invention is directed to an apparatus which is inserted between the inner walls of pneumatic tire casings mounted on a dual wheel assembly. The apparatus is formed of one or more annular elements having an outer circumferential face, an inner circumferential face and left and right sidewalls. The major portion of each of the left and right sidewalls is substantially planar. At least one of the left and right sidewalls has a plurality of cooling grooves. The cooling grooves extend from the outer circumferential face to the inner circumferential face. The cooling grooves are substantially U-shaped and have a uniform depth throughout their entire length. The cooling grooves are uniformly spaced about the circumference of the annular member. The cooling grooves readily dissipate the heat which is generated by the brakes and the flexing of the tire casings when placed under a load. The outer circumferential face of the annular member is positioned intermediate the flex point of the pneumatic tire casings and the treads thereof.

20 Claims, 1 Drawing Sheet

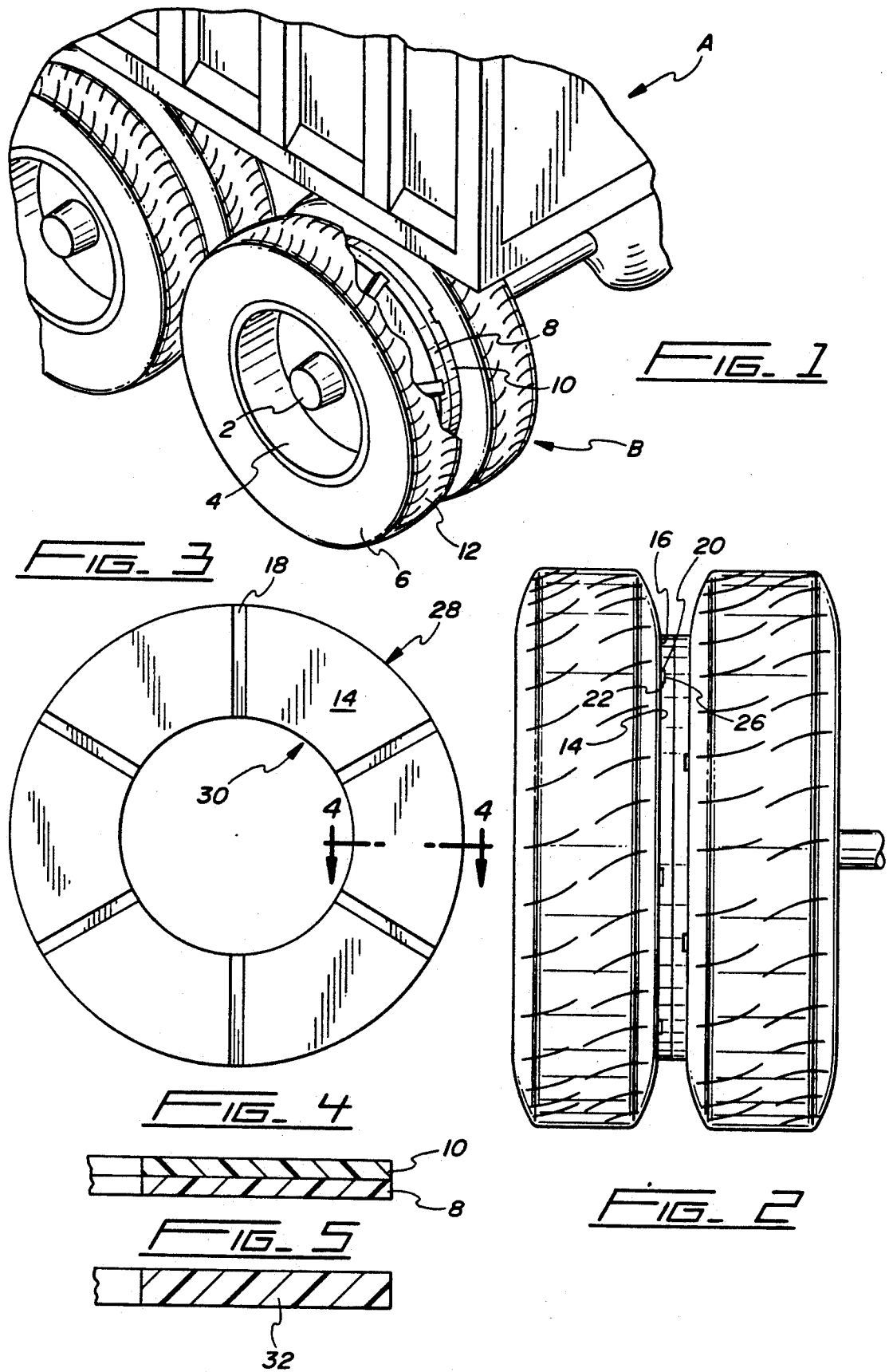

APPARATUS FOR PREVENTING FOREIGN OBJECTS FROM LODGING BETWEEN THE INNER WALLS OF VEHICLE TIRES MOUNTED ON A DUAL WHEEL ASSEMBLY

FIELD OF INVENTION

The present invention is generally related to dual wheel assemblies commonly found on heavy industrial equipment. More specifically, the present invention is related to devices to free or prevent foreign objects from lodging between the inner walls of vehicle tires mounted on a dual wheel assembly.

BACKGROUND OF THE INVENTION

Heavy industrial equipment such as dump trucks, tractors and the like commonly employ dual wheel assemblies. Typically, these assemblies include two rims mounted on a common axis having a pair of pneumatic tires, one mounted on each rim. A spacing is provided between the opposing walls of the pneumatic tire casing. Foreign objects such as rocks and the like can become lodged in the spacing formed between the pneumatic tire casings. This often leads to irreparable damage to the tire casings. A number of devices have been employed to either free or prevent foreign objects from becoming lodged in the space between the pneumatic tire casings of a dual wheel assembly. A common method used to free objects is to suspend a steel bar from the underside of the frame of the vehicle which protrudes in the space between the two Case 5942 tires. If a rock is driven over and becomes lodged between this space it will rotate with the tires until such time as it strikes the steel bar. However, there are numerous disadvantages to this system. For instance, if a rock becomes severely lodged between the pneumatic tire casings, the act of dislodging it by the steel bar can in and of itself lacerate one or both of the tire casings. Also, small rocks can become lodged between one tire casing and the steel bar. Once again the tire casing will be exposed to undesirable forces which will likely damage the same.

It has also been proposed to provide large metallic plate shaped members in the space between the pneumatic tire casings. See for example U.S. Pat. No. 2,397,741. However, this arrangement is also unsatisfactory. When a large solid object is run over by a truck, forklift or other heavy industrial equipment, the weight of the vehicle can apply such a force to the object that it in turn bends the plate shaped objects into the pneumatic tire casings. This will not only damage the tires but will likely render the vehicle inoperative.

OBJECTS AND SUMMARY OF THE INVENTION

An object of the present invention is to provide an apparatus for preventing foreign objects from becoming lodged between the inner walls of tire casings mounted on dual wheel assemblies which overcomes the above disadvantages of the prior art.

Another object of the present invention is to provide a device which prevents foreign objects from lodging between tire casings and can be readily adjusted to accommodate various different spacing widths.

A further object of the present invention is to provide a device which prevents foreign objects from lodging between the inner walls of tire casings and which can readily compensate for the bulge or flex of the tire casings as a load is placed thereon.

Still a further object of the present invention is to provide a device for preventing foreign objects from lodging between the inner walls of tire casings which can readily dissipate the heat generated from the vehicle's brakes.

Yet still another object of the present invention is to provide a device for preventing foreign objects from lodging between tire casings of a dual wheel assembly which can readily dissipate the heat generated by flexing of the tire casings as a load is placed thereon.

In summary, the present invention is directed to an apparatus which is inserted between the inner walls of pneumatic tire casings mounted on a dual wheel assembly. The apparatus is formed of one or more annular elements having an outer circumferential face, an inner circumferential face and left and right sidewalls. The major portion of each of the left and right sidewalls is substantially planar. At least one of the left and right sidewalls has a plurality of cooling grooves formed therein. The cooling grooves extend from the outer circumferential face to the inner circumferential face. The cooling grooves are substantially U-shaped and have a uniform depth throughout their entire length. The cooling grooves are uniformly spaced about the circumference of the annular member. The cooling grooves readily dissipate the heat which is generated by the brakes and the flexing of the tire casings when placed under a load. The outer circumferential face of the annular member is positioned intermediate the flex point of the pneumatic tire casings and the treads thereof.

DETAILED DESCRIPTION OF THE DRAWINGS

FIG. 1 is a fragmentary perspective view of a rear end of a truck having inserts formed in accordance with the present invention mounted between the pneumatic tire casings of a dual wheel assembly.

FIG. 2 is a rear elevational view of a dual wheel assembly employing the present invention.

FIG. 3 is a side elevational view of an insert formed in accordance with the present invention.

FIG. 4 is a sectional view taken along lines 4—4 in FIG. 3.

FIG. 5 is a cross sectional view of an alternative embodiment of the present invention.

DETAILED DESCRIPTION OF THE PREFERRED EMBODIMENT OF THE PRESENT INVENTION FIGURES 1 TO 4

The first preferred embodiment of the present invention Will be described in detail with reference made to the above identified figures.

Referring to FIG. 1, the rear end of a truck A is illustrated having several dual wheel assemblies B. The dual wheel assemblies B are identical in construction and therefore it is necessary to only describe one. The dual wheel assembly B includes an axle 2 having a pair of conventional wheel rims 4 mounted thereon. A pneumatic tire casing 6 is mounted on each of the rims 4. A pair of inserts 8 and 10 are disposed in the spacing between the pneumatic tire casings 6. The annular members 8 and 10 are each formed from high density foam rubber. The percentage of air cells in the annular members 8 and 10 preferably range from 5% to 50%. Most preferably, the percentage of air cells ranges from 20 to 30%.

The outermost radial point of the annular members 8 and 10 is positioned halfway between the sidewall flex point of the pneumatic tire casings 6 and the treads 12 thereof.

As is readily evident from FIGS. 2 and 4, the surface 14 of annular member 8 which is disposed in abutting contact with the inner wall 16 of the pneumatic tire casing 6 has a plurality of cooling grooves 18. As is seen in FIG. 2, the cooling grooves are substantially U-shaped and include sidewalls 20 and 22 and bottom 26. The sidewalls 20 and 22 extend substantially perpendicular to bottom 26 and surface 14. Bottom 26 extends substantially parallel to surface 14.

Also, the cooling grooves 18 have a uniform depth and width. The cooling grooves communicate with the outer circumferential surface 28 of annular member 8 and the inner circumferential surface 30.

As seen in FIG. 3, the grooves 18 are disposed at equal distances from each other about the circumference of the annular member 8. Although six cooling grooves are shown formed in the sidewall 14 of annular member 8, it will be readily appreciated that this number may be varied as desired.

Preferably, the annular members 8 and 10 have a thickness of approximately one inch. Therefore, the annular members 8 and 10 have an overall thickness of approximately two inches. Thus, where the spacing between the pneumatic tire casing 6 is approximately two inches it will be readily appreciated that two annular members are necessary. By providing the annular member with a uniform thickness of approximately one inch, it is possible to merely add additional spacing rings to fill larger voids. For example, where the pneumatic tire casings are spaced three inches apart, it is only necessary to add an additional ring. Thus, the annular members 8 and 10 can be readily employed for a variety of different spacings between the pneumatic tire casings.

ALTERNATIVE EMBODIMENT

Referring to FIG. 5 an alternative embodiment of the present invention is illustrated. More specifically, annular member 30 has a thickness which is equal to the sum of the thicknesses of annular members 8 and 10. Therefore, it is necessary to only use one insert to fill a void of approximately two inches between the pneumatic tire casings 6. Annular member 30 is identical in all other respects to annular members 8 and 10. Therefore, it is not necessary to further elaborate on the particulars of annular member 32.

OPERATION

As the truck A travels, the lower portions of the pneumatic tire casings 6 which are in contact With the ground surface and placed under load will bulge at the sidewall flex point of the tire. Since the annular members 8 and 10 are formed of foam rubber, they can readily compensate for the bulging of the tire casings 6. More specifically, the annular members 8 and 10 will be compressed at the flex point of the tire casings 6 causing the outer circumferential face 28 expand downwardly towards the ground area. By positioning the outer circumferential face 28 halfway between the flex point of the tire casing and the tread 12, it is possible to avoid the circumferential face 28 from contacting the ground surface when the pneumatic tire casings 6 bulge. The bulging of the tires will have a "pinching" effect and provide that portion of the annular member 8 extending downwardly therefrom with greater rigidity. Thus, once a rock is encountered the corresponding portion of the circumferential face 28 will only slightly deform preventing the rock from becoming lodged between the pneumatic tire casings 6. As the area of the tire casing 6 adjacent the rocks rolls away from the ground, the tension between the corresponding portion of the tire casing, caused by the bulge, and the ground area is released, thus freeing the rock.

During operation of the vehicle A, the brakes and flexing of the tire casings will generate heat. Therefore, it is necessary to dissipate this heat generated to avoid damage to the annular members 8 and 10 as well as the pneumatic tire casing 6. Cooling grooves 18 provide an air channel which extends from the inner circumferential face 30 to the outer circumferential face 28. These grooves 18 will sufficiently dissipate the heat generated by the brakes and the bulging of the tire casing 6 without permitting foreign objects to become lodged between the annular members 8 and 10 and the pneumatic tire casings 6. More specifically, it will be readily appreciated that only a fraction of the grooves 18 in either annular member 8 or 10 are at any one time positioned adjacent the ground area. Further, the width and thickness of the cooling grooves 18 is considerably smaller than that of the overall width of the spacing between the pneumatic tire casing 6. Therefore, the likelihood of a foreign object from becoming lodged in this area is extremely remote.

It will be readily appreciated from the above description that the subject invention is a significant improvement over previously known devices. The foam rubber construction provides the annular members with the necessary elasticity to compensate for the bulge of the sidewalls of the pneumatic tire casings adjacent the ground area. Also, the provision of radially extending cooling grooves 18 significantly reduces the likelihood of a foreign object from becoming lodged therein. The uniform thickness of approximately one inch of the annular members 8 and 10 permit them to be readily adapted for various spacings between pneumatic tire casings 6.

While the invention has been disclosed as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

I claim:

1. An apparatus for preventing foreign objects from lodging between inner walls of vehicle tires mounted on a dual wheel assembly, comprising:
   a) an annular member having an outer circumferential face, an inner circumferential face, a left sidewall and a right sidewall, said inner and outer circumferential faces extend between said left and right sidewalls; and,
   b) at least one of said left and right sidewalls having at least one cooling groove, said cooling groove extending from said outer circumferential face to said inner circumferential face.

2. An apparatus as in claim 1, wherein:

a) said at least one cooling groove has a uniform depth.

3. An apparatus as in claim 1, wherein:
a) said cooling groove is U-shaped.

4. An apparatus as in claim 1, wherein:
a) said at least one cooling groove having first, second and third surfaces, said second surface extends between said first and third surfaces, said second surface extends perpendicular to at least one of said first and third surfaces.

5. An apparatus as in claim 4, wherein:
a) said first and third surfaces of said cooling groove extend perpendicular to said left and right sidewalls.

6. An apparatus as in claim 1, wherein:
a) said at least one cooling groove has a uniform width.

7. An apparatus as in claim 1, wherein:
a) said annular member is formed from a resilient material.

8. An apparatus as in claim 7, wherein:
a) said annular member is formed from foam rubber.

9. A dual wheel assembly comprising:
a) first and second wheel rims mounted on an axle;
b) first and second tires mounted on said first and second wheel rims, respectively;
c) means for preventing foreign objects from lodging between said first and second tires, said preventing means being positioned between said first and second tires, said preventing means being formed from a resilient material;
d) said preventing means including left and right sidewalls, each having at least one cooling groove; and
e) said at least one cooling groove in said left and right sidewalls each extending inwardly from an outermost portion of said preventing means with respect to said axle.

10. As assembly as in claim 9, wherein:
a) said preventing means includes at least first and second annular members, said first annular member abuts said second annular member.

11. An apparatus as in claim 9, wherein:
a) said outermost portion of said preventing means is positioned intermediate the sidewall flex point of said first and second tires and the tread of said first and second tires.

12. An apparatus as in claim 9, wherein:
a) said left and right sidewalls are planar.

13. An apparatus as in claim 10, wherein:
a) said first and second annular members are of equal thickness.

14. An apparatus as in claim 9, wherein:
a) a portion of each of said left and right sidewalls abuts the corresponding tire.

15. An apparatus as in claim 9, wherein
a) said preventing means is formed from high density foam rubber.

16. An apparatus for preventing foreign objects from lodging between inner walls of vehicle tires mounted on a dual wheel assembly, comprising:
a) an annular member having an outer circumferential face, an inner circumferential face, a left sidewall and a right sidewall, said inner and outer circumferential faces extend between said left and right sidewalls;
b) said annular member being formed from a resilient material; and,
c) at least one of said left and right sidewalls having a cooling groove formed therein, said cooling groove communicates with and extends inwardly from said outer circumferential face.

17. An apparatus as in claim 16, wherein:
a) said resilient material is high density foam rubber.

18. An apparatus as in claim 17, wherein:
a) said high density foam rubber has 20% to 30% air cells.

19. An apparatus as in claim 16, wherein:
a) said left and right sidewalls are planar.

20. An apparatus as in claim 16, wherein:
a) said annular member has a uniform thickness; and,
b) said cooling groove has a uniform depth which is less than the thickness of said annular cooling groove.

* * * * *